United States Patent [19]

Lafferty

[11] Patent Number: 5,270,636

[45] Date of Patent: Dec. 14, 1993

[54] REGULATING CONTROL CIRCUIT FOR PHOTOVOLTAIC SOURCE EMPLOYING SWITCHES, ENERGY STORAGE, AND PULSE WIDTH MODULATION CONTROLLER

[76] Inventor: Donald L. Lafferty, 724 Tampico, Walnut Creek, Calif. 94598

[21] Appl. No.: 837,328

[22] Filed: Feb. 18, 1992

[51] Int. Cl.$^5$ ............................ H02J 7/00; G05F 1/613
[52] U.S. Cl. ..................................... 320/61; 323/222; 323/299; 323/906
[58] Field of Search ............... 323/222, 223, 299, 351, 323/906; 320/62; 136/292, 293

[56] References Cited

U.S. PATENT DOCUMENTS

| | | | |
|---|---|---|---|
| 3,384,806 | 5/1968 | Hartman | 322/2 |
| 3,696,286 | 10/1972 | Ule | 323/15 |
| 4,323,845 | 4/1982 | Leach | 323/224 |
| 4,347,474 | 8/1982 | Brooks et al. | 323/224 |
| 4,604,567 | 8/1986 | Chetty | 323/299 |
| 4,725,768 | 2/1988 | Watanabe | 323/222 |
| 4,736,151 | 4/1988 | Dishner | 323/224 |
| 4,864,213 | 9/1989 | Kido | 323/222 |
| 4,873,480 | 10/1989 | Lafferty | 323/906 |
| 4,958,121 | 9/1990 | Cuomo et al. | 323/224 |
| 4,970,451 | 11/1990 | Suomalainen | 323/222 |
| 5,027,051 | 6/1991 | Lafferty | 323/222 |

FOREIGN PATENT DOCUMENTS

| | | | |
|---|---|---|---|
| 2497421 | 7/1982 | France | 323/222 |
| 0444172 | 5/1985 | U.S.S.R. | 323/222 |

OTHER PUBLICATIONS

"Reducing Switching Stress in High Power, High Voltage DC-DC Converters" by K. Stuart, Proceedings of Powercon, May 4-6, 1978.

Dunlop, J. et al., "Performance of Battery Charge Controllers: First Year Test Report", Proc. 22nd IEEE PV Conf., Las Vegas, Nev., 640 (1991).

*Primary Examiner*—Steven L. Stephan
*Assistant Examiner*—Thomas M. Dougherty

[57] ABSTRACT

A regulating circuit controls current flow from a photovoltaic power source (20) to a storage battery (38) to improve the conversion of solar energy to electric energy. Two transistors (22, 30) are switched on and off at high frequency to regulate the average current flow to the battery. A pulse-width-modulator control chip (42) varies the on-time of each transistor independently to provide separate control of source voltage and circuit output voltage. The source is regulated to produce maximum power and the output voltage is regulated to provide an optimum battery charging voltage. The maximum available energy is transferred from the source to the battery, thereby improving the conversion efficiency of the system.

17 Claims, 1 Drawing Sheet

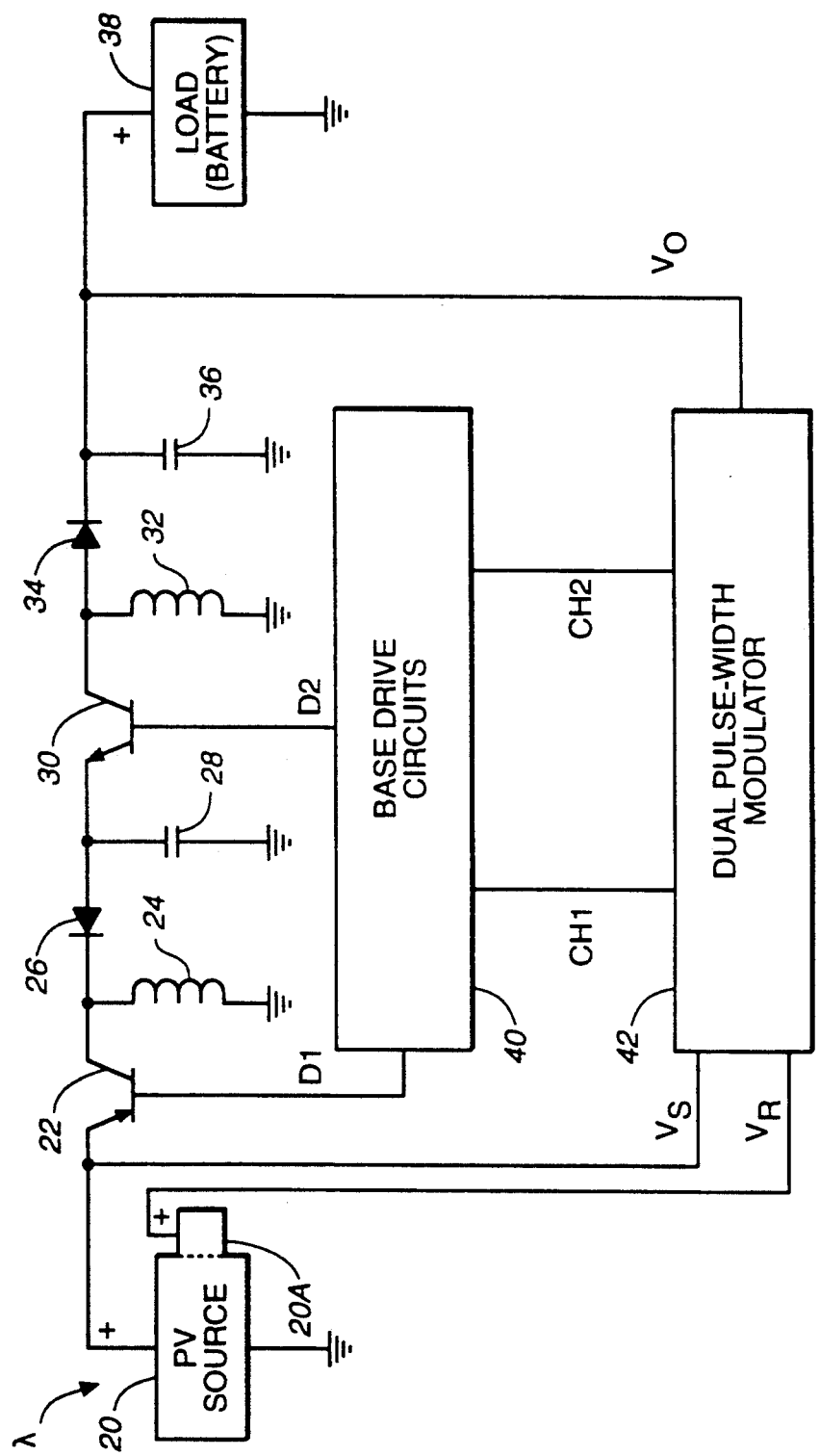

REGULATING CONTROL CIRCUIT FOR PHOTOVOLTAIC SOURCE EMPLOYING SWITCHES, ENERGY STORAGE, AND PULSE WIDTH MODULATION CONTROLLER

BACKGROUND —FIELD OF INVENTION

This invention relates to a system for converting solar energy to electrical energy by an array of photovoltaic cells, specifically to a circuit for improving the conversion efficiency of such a system.

BACKGROUND —DISCUSSION OF PRIOR ART

Photovoltaic (PV) power sources are known and used for converting incident solar energy to electrical energy; such sources comprise an array of semiconductor PV cells. A charge-control circuit is usually provided to regulate current flow from the PV power sources to storage batteries, which store the energy. Ideally, such a charge-control circuit should provide a voltage-current profile which conforms to the charging characteristics of the batteries. I.e., the circuit should transfer the maximum available energy from the PV source to charge the batteries. In practice, known charge-control circuits perform these functions with limited success, resulting in inefficient use of the energy converted by the source.

A number of circuits in current use by manufacturers were evaluated recently under a government-sponsored program established to improve reliability and performance of PV power systems. Preliminary results are presented in a recent report: Dunlop, J., et al., "Performance of Battery Charge Controllers: First Year Test Report", Proc. of the 22nd IEEE PV Specialists Conf., Las Vegas, Nev., 640, (1991).

These reports summarize characteristics of the various circuits and describe methods used to regulate current flow to the batteries. The only control exercised during the charging cycle resulted from switching off the charging current to prevent damage to the battery. None of the circuits could supply the full available energy to the battery.

Switching voltage regulators have been used in a number of different circuits to control power flow from a photovoltaic (PV) source to a load. Some pertinent examples are illustrated in the following U.S. patents: Hartman (U.S. Pat. No. 3,384,806, 1968), Ule (U.S. Pat. No. 3,696,286, 1972), Chetty (U.S. Pat. No. 4,604,567, 1986), Lafferty (U.S. Pat. No. 4,873,480, 1989), and Lafferty (U.S. Pat. No. 5,027,051, 1991).

Each of these circuits is concerned with the efficient transfer of energy from a PV source to a load. However, none of these circuits is able to provide the degree of voltage control needed for the most efficient charging of a battery.

OBJECTS AND ADVANTAGES

It is, therefore, a primary object of the present invention to provide an improved photovoltaic charge-control system, specifically one which increases the efficiency of energy transfer from a PV source to a battery. Other objects are to provide such a system with an improved coupling network connecting the PV source to the battery, and to provide such a network where the conversion efficiency is improved by using a regulator whose output voltage matches the charging requirements of the battery while delivering maximum energy to the battery.

Therefore, the present invention offers several advantages over previous charge-control circuits.

Also, my circuit is simple, economical, and uses components and techniques developed for highly-efficient switching power supplies.

Further objects and advantages will become apparent as the description proceeds.

DRAWING FIGURE

The single drawing FIGURE shows a functional block diagram of a solar energy charge-control system which incorporates a converter with a regulated output voltage in accordance with my invention.

DRAWING REFERENCE NUMERALS

20: PV power source
20A: PV reference cell
22: pnp transistor, # D45 (General Electric)
24: 280 uH inductor
26: Schottky diode
8: 100 uF capacitor
30: npn transistor, # D44 (General Electric)
32: 280 uH inductor
34: Schottky diode
36: 100 uf capacitor
38: storage battery; 12 V, 100 amp-hours
40: IC power driver chip, # TPIC2406 (Texas Instruments)
42: IC control chip, # TL1451 (Texas Instruments)

DESCRIPTION OF CHARGE-CONTROL CIRCUIT

The drawing FIGURE shows a schematic and block diagram of an electrical system, circuit, or network which couples a PV (photovoltaic) module (array of PV cells) 20 to a storage battery 38. PV module 20 contains a well-known array of solar cells which converts received solar energy to electrical energy through the photovoltaic effect. This energy is transferred by the circuit shown to battery 38, which stores the energy in chemical form. Module 20 can be of any size, type, and number of cells, but in one preferred embodiment it contained 36 segments of single-crystal silicon cells which can maintain a 12-volt battery in a state of charge, provides a nominal power of 55 W at 16.8 V and 3.26 A at Standard Test Conditions (25° C., 1 kW/m$^2$ irradiation at AM 1.5 spectral distribution). A single cell, 20A, within the module, identical to all other cells, is electrically isolated to serve as a reference cell. Cell 20A is unloaded, i.e., its voltage is sensed by the charge control circuit and no significant current is drawn from this cell.

The coupling circuit comprises all other components in the figure (component values and identifications indicated in reference numerals list above).

Specifically, the main components of the circuit are a pulse-width modulator (PWM) 42, a power driver 40, two transistors 22 and 30 operating as synchronized switches, two inductors 24 and 32, two diodes 26 and 34, and two capacitors 28 and 36.

The emitter of transistor 22 is connected to the top or positive (+) output terminal of module 20; the other (bottom) terminal of module 20 is grounded. The collector of transistor 22 is connected to the cathode of diode 26, and to one side of inductor 24. The bases of transistors 22 and 30 are connected to output lines D$_1$ and D$_2$ of a base drive amplifier circuit 40, described infra. The other terminal of inductor 24 is grounded. The anode of diode 26 is connected to the emitter of transistor 30 and to one side of capacitor 28, the other side of which is grounded. The collector of transistor 30 is connected to the anode of diode 34 and to one side of inductor 32. The other side of inductor 32 is grounded. The cathode of diode 34 joins one side of capacitor 36 to load 38. The other side of capacitor 36 is grounded, as is the second side of the load. The positive terminal of reference cell 20A is connected to PWM 42 and the negative side of 20A is grounded.

PWM 42 is an integrated circuit (IC) which regulates the flow of charge from source to load by controlling the conduction times of transistors 22 and 30. To do so, PWM 42 must monitor the input and output voltages as well as the voltage of the reference cell. The voltage across source 20, $V_s$, is sampled by a connection from the positive terminal of PV source 20 to one of the lefthand inputs of PWM 42. The output voltage of the coupling circuit, $V_O$, is a feedback voltage which is sensed through a connection from the positive terminal of the load to the righthand input terminal of PWM 42. The reference voltage, $V_R$, is obtained through a connection from the positive terminal of reference cell 20A to the other lefthand input terminal of PWM 42.

PWM 42 is a dual pulse-width modulation control circuit, type TL1451ACN, manufactured by Texas Instruments. It contains all the functions necessary to control two independent switches. PWM 42 compares $V_S$ and $V_R$ to generate a train of output pulses on line CH1 which controls the percentage of ON time of transistor 22. This circuit is a source feedback loop. At the same time, it compares $V_O$ with a fixed internal reference voltage to generate a second train of output pulses on line CH2 which controls the percentage of ON time of transistor 30. The latter circuit is a battery feedback loop. The pulse repetition rate in each case is a fixed frequency of 25 kHz.

Two signals of the proper widths are supplied to a base drive circuit IC 40 for transmission as high-current pulses to the bases of transistor switches 22 and 30. IC 40 contains four power MOSFET switches controlled by input storage latches. It translates control logic signals (a few mA) from IC 42 of the higher current (several hundred mA) requirements of switches 22 and 30. The signal input lines to power IC 40 are labeled channel 1 (CH1) and channel 2 (CH2), and the output base drive lines, D1 and D2. The outputs on lines D1 and D2 are sufficient to drive transistors 22 and 30.

OPERATION OF REGULATING CIRCUIT

The regulating circuit is a further development, improvement, and enhancement of the circuits in my previous patents supra; it permits a more refined control of the charging voltage applied to the battery. Specifically, it allows the PV source to supply current at any voltage within the required charging range. Its operation will now be reviewed briefly from this perspective.

The output voltage and current of PV module 20 changes continually with insolation (the amount of solar radiation) and temperature. Maximum power transfer to the battery can be maintained by adjusting the current from the source to the battery. The proper value of current is specified by the open-circuit voltage of reference cell 20A embedded in PV module 20. Source voltage $V_S$ and reference voltage $V_R$ are compared continually to produce a difference signal indicating the correction to be made in $V_S$. The average current through transistor 22 is varied by changing its conduction time to increase or decrease the flow as needed to give the required $V_S$. Transistor 22 is pulsed on and off at a high frequency (e.g., 25 kHz) by PWM 42. Thus, $V_S$ tracks the value of source voltage required for maximum power output. The source is thereby regulated for optimal performance with changing insolation and temperature.

Independent control of the voltage supplied to the battery is needed for effective energy storage. Charge should be delivered to the battery at a voltage exceeding the battery voltage by a volt or two, depending on the state of charge of the battery. This constraint establishes a window or range for the charging voltage. Controlling the conduction time of transistor 30 will ensure that the charging voltage lies within this range. Here, output voltage $V_O$ is compared to an internal voltage reference provided by PWM 42. PWM 42 generates a resulting error signal which controls the conduction time of transistor 30 in a manner similar to that used for transistor 22. Thus, the circuit regulates the average current through transistor 30 to control the battery charging voltage.

The switching network depicted in the drawing figure is composed of two similar sections. The input section comprising transistor 22, inductor 24, diode 26, and capacitor 28 is one part and the output section comprising transistor 30, inductor 32, diode 34, and capacitor 36 is a second part.

The operation of the input section is briefly summarized. While switch 22 is conductive, energy is delivered from source 20 and stored in inductor 24. When switch 22 opens, inductor 24 tries to sustain the decaying magnetic field by generating a back emf. Diode 26 becomes forward biased and switches into conduction. The resultant pulse of current transfers the energy stored in inductor 24 to capacitor 28. The switching sequence continues as capacitor voltage $V_{28}$ builds up to a steady-state value in which the input current equals the output current.

The capacitor voltage is a function of the duty cycle $D_S$ of switch 22 and input voltage $V_S$:

$$V_{28} = -V_S \times D_S/(1-D_S)$$

Note that the capacitor voltage is always negative, since the duty cycle $$D_S = T_{ON}/(T_{ON} + T_{OFF})$$

has only positive values.

Also of consequence is that the capacitor voltage is zero for a duty cycle of zero, is infinitely large for a duty cycle of unity, and is equal in magnitude to the input voltage for a duty cycle of ½.

The output section behaves the same way as the input section, with the exception that the input is the negative voltage $V_{28}$ across capacitor 28 which is converted to a positive output voltage across capacitor 36. The output voltage $V_O$ is given by $$V_O = V_S[D_S D_O/(1-D_S)(1-D_O)]$$

Where $D_O$ is the duty cycle of switch 30 in the output section.

The condition, $D_S + D_O = 1$ will result in $V_O$ equal to $V_S$. Under these circumstances, variations in one duty cycle must be balanced by opposing variations in the other. That is, the sum of the two ON times of the switches must equal the period of the pulse frequency.

The operation of the circuit can be illustrated by an example of the functional relation between the two duty cycles. Suppose that it is desired to have $V_O = V_S = 15$ V.

Low levels of light result in low quantities of charge production in the PV source and hence a low available current. To charge the battery optimally under this condition, the duty cycle should be small, i.e., the input switch should have a small percentage of conductive or ON time; say, $D_S = 10\%$. (The current through a switch is proportional to its ON time.) The voltage across capacitor 28 is then $-1.7$ V, since the capacitor is charged to a voltage:

$$V_{28} = -V_S \times D_S/(1 - D_S) = -15 \times 0.01/(1 - 0.01) = -1.7 \text{ V}$$

This is the input voltage for switch 30. The required duty cycle for switch 30 is $D_O = 90\%$ because $D_S + D_O = 1$. This provides a value for $V_O$ of $+15$ V:

$$V_O = V_{36} = -V_{28} \times D_O/(1 - D_O) = 1.7 \times 0.9/(1 - 0.9) = 15 \text{ V}$$

On the other hand, a bright, sunny day might need an input duty cycle of 90% for maximum power output. Capacitor 28 will charge up to an average voltage of $-135$ V. The conversion of this value to an output of $+15$ V requires an output duty cycle of only 10%.

It is to be appreciated that a practical circuit will deviate from the qualitative picture depicted above. The input voltage will shift with both sunlight and temperature, and the output voltage will have to be adjusted up or down to accommodate changing load requirements. The two duty cycles will follow a similar pattern to that shown above but with further ramifications.

The source voltage is constrained by the regulating circuit to produce maximum power and the output voltage of the regulating circuit is constrained to produce a controlled charging voltage. Under these conditions, maximum energy is transferred to the battery at a proper charging voltage.

CONCLUSIONS, RAMIFICATIONS, AND SCOPE OF INVENTION

The reader will see that I have provided a regulating circuit with properties especially suited to the efficient charging of a storage battery by a photovoltaic power source. Maximum energy is extracted from the PV source for use in charging the battery.

While a simple version of the circuit has been presented here, one skilled in the art can provide alternative circuits with properties similar to those of the circuit illustrated. Integrated circuits providing similar functions as those shown can easily be substituted or combined to achieve similar results. In particular, the functions of the base drive IC and the PWM IC can be combined in a single control IC. Values, identifications, and other parameters of the components indicated are exemplary and can be changed as desired. The transistors shown can be replaced by other solid-state devices capable of switching at high frequencies. Further, the storage battery will usually buffer an electrical load in practical applications. A number of such circuits can be arranged in parallel to handle currents from many arrays of PV cells charging numerous batteries, all regulated by a central control system.

Accordingly, the scope of the invention should be determined not by the embodiment illustrated, but by the appended claims and their legal equivalents.

I claim:

1. A regulating circuit for transferring maximum energy at a selected voltage from a photovoltaic source to a battery, comprising:
   a main first energy flow path for connecting said source to said battery
   first switch means for opening and closing said main first energy flow path to provide a first energy pulse,
   first storage means for receiving and storing said first energy pulse,
   an auxiliary first energy flow path for connecting said source to said battery,
   second switch means for opening and closing said auxiliary first energy flow path for transfer of said first energy pulse from said first storage means,
   second storage means for receiving and storing said first energy pulse,
   a main second energy flow path for connecting said source to said battery
   third switch means for opening and closing said main second energy flow path to provide a second energy pulse,
   third storage means for receiving and storing said second energy pulse,
   an auxiliary second energy flow path for connecting said source to said battery,
   fourth switch means for opening and closing said auxiliary second energy flow path for transfer of said second energy pulse,
   fourth storage means for receiving and storing said second energy pulse for subsequent transfer of the energy of said second energy pulse to said battery,
   control means for controlling said switches in response to a plurality of error signals,
   a source feedback loop for supplying a first error signal to said control means,
   a battery feedback loop for supplying a second error signal to said control means,
   said control means being arranged to open and close said first switch means and simultaneously close and open said second switch means with a first duty cycle determined by said first error signal, and
   said control means also being arranged to open and close said third switch means and simultaneously close and open said fourth switch means with a second duty cycle determined by said second error signal.

2. A regulating circuit for transferring maximum energy at a selected voltage from a photovoltaic source to a battery, comprising:
   a photovoltaic power source having first and second output terminals, said second output terminal being opposite in polarity to the voltage at said first terminal,
   first switching means having an input for connection to said first output terminal of said photovoltaic power source, said first switching means having an output, first magnetic energy storage means having an input connected to said output of said first switching means and an output for connection to said second output terminal of said photovoltaic power source, second switching means having an output also connected to said output of said first switching means and to said input of said first magnetic energy storage means, said second switching means having an input, first electric energy storage means having an output connected to said input of said second switching means and an input connected to said second terminal of said photovoltaic source, third switching means having an output connected to said output of said first electric energy storage means, said third switching means having an input, second magnetic energy storage means having an output connected to said input of said third switching means and an input connected to said second terminal of said photovoltaic source, fourth switching means having an input connected to said output of said second magnetic energy storage means, said fourth switching means having an output, second electric energy storage means having an output connected to said second terminal of said photovoltaic source and an input connected to said output of said fourth switching means and to a first terminal of a battery, said battery having a second terminal opposite in polarity to said first terminal connected to said second terminal of said photovoltaic source, a source feedback loop for supplying a first error signal representative of the potential of said source, control means, responsive to said first error signal, for causing a first control signal to have a first duty cycle with relative on and off times determined by said first error signal, a battery feedback loop for supplying a second error signal representative of the state of charge of said battery, said control means also being responsive to said second error signal for causing a second control signal to have a second duty cycle with relative on and off times determined by said second error signal, drive means for supplying said first control signal for opening and closing said first switch means, and simultaneously closing and opening said second switch means so as to control the power flow to said first magnetic storage means and thence to said first electric storage means, said drive means also being responsive to said second control signal for causing third switch means to open and close, and simultaneously, thereby causing said fourth switch means to close and open, so as to effect said power flow from said first electric storage means to said second magnetic storage means and from there to said second electric storage means for transfer to said battery.

3. The switching circuit of claim 2 wherein said first switching means is a first transistor.

4. The switching circuit of claim 2 wherein said first magnetic energy storage means is a first inductor.

5. The switching circuit of claim 2 wherein said second switching means is a first diode.

6. The switching circuit of claim 2 wherein said first electric energy storage means is a first capacitor.

7. The switching circuit of claim 2 wherein said third switching means is a second transistor.

8. The switching circuit of claim 2 wherein said second magnetic energy storage means is a second inductor.

9. The switching circuit of claim 2 wherein said fourth switching means is a second diode.

10. The switching circuit of claim 2 wherein said second electric energy storage means is a second capacitor.

11. The switching circuit of claim 2 wherein said control means is a pulse-width modulator.

12. The switching circuit of claim 2 wherein said second switching means is a third transistor.

13. The switching circuit of claim 2 wherein said fourth switching means is a fourth transistor.

14. A circuit for transferring maximum available energy at selected voltage from a photovoltaic source to a battery to be charged, comprising:

a switching network for coupling said photovoltaic source to said battery, said switching network including a plurality of switches, each of said switches having a current-transmission on state and a current-blocking off state, so that said network can regulate energy flow from said source to said battery in accordance with the relative on and off times of said plurality of switches, source reference voltage means for deriving a source reference voltage from an unloaded photovoltaic cell, source error signal means for comparing the voltage of said photovoltaic source to said source reference voltage to provide a source error signal, battery error signal means for deriving a battery error signal from a comparison of a battery voltage signal, indicative of the state of charge of said battery, to a standard reference voltage, and coupling means for coupling said source error signal and said battery error signal to said switching network so that the relative on and off times of said plurality of switches, and hence the energy transferred from said source to said load, will be controlled by said source error signal and said battery error signal.

15. A circuit for transferring maximum energy at a selected voltage from a photovoltaic source to a battery, comprising:

first regulator means, comprising a first plurality of switches and energy storage elements, for regulating current flow from said source, source error signal means for deriving a source error signal from a comparison of the voltage of said source to the open circuit voltage of an unloaded photodiode, a source feedback system for providing a first control signal to said first regulator means for opening and closing said first plurality of switches in response to said source error signal, second regulator means comprising a second plurality of switches and energy storage elements, for regulating current flow to said battery, battery error signal means for deriving a battery error signal from a comparison of a battery voltage signal, indicative of the state of charge of said battery, to a standard reference voltage, and a battery feedback system for providing a second control signal to said second regulator means for opening and closing said second plurality of switches in response to said battery error signal.

16. The circuit of claim 15 wherein the first regulator means is a first inverting regulator.

17. The circuit of claim 15 wherein the second regulator means is a second inverting regulator.

* * * * *